United States Patent [19]

Scheuermann et al.

[11] 3,910,912
[45] Oct. 7, 1975

[54] N-SUBSTITUTED IMINOCOUMARIN DYES

[75] Inventors: Horst Scheuermann; Dietmar Augart, both of Ludwigshafen; Wolfgang Mach, Hockenheim, all of Germany

[73] Assignee: Badische Anilin- & Soda-Fabrik Aktiengesellschaft, Ludwigshafen (Rhine), Germany

[22] Filed: May 23, 1973

[21] Appl. No.: 362,900

[30] Foreign Application Priority Data
May 30, 1972 Germany.............................. 2226211

[52] U.S. Cl. ................... 260/256.4 Q; 260/250 Q; 260/256.5 R; 260/304; 260/306.8 R; 260/306.8 D; 260/309.2; 260/332.2 A; 260/345.2; 260/347.5; 260/242; 260/299; 8/1 D
[51] Int. Cl.² ......................................... B07D 239/74
[58] Field of Search ............................. 260/256.4 Q

[56] References Cited
UNITED STATES PATENTS
3,704,302  11/1972  Euomoto et al. ............. 260/256.4 Q
B189,773   1/1975   Boehmke ....................... 260/307 R FOREIGN PATENTS OR APPLICATIONS
556,375   11/1974   Switzerland ...................... 260/307

OTHER PUBLICATIONS

Gore et al., Chemistry of Natural and Synthetic Colouring Matters, 1962, p.

Venkataraman, The Chemistry of Synthetic Dyes, Vol. II, pp. 775, 1034–1035, ibid Vol. IV, pp. 362–368.

Ibid Vol. IV, pp. 362–368.

*Primary Examiner*—Donald G. Daus
*Assistant Examiner*—David E. Wheeler
*Attorney, Agent, or Firm*—Johnston, Keil, Thompson & Shurtleff

[57] ABSTRACT

A 7-amino-2-iminocoumarin derivative bearing an aromatic or heteroaromatic radical in the 3-position. The compounds are valuable dyes which give bright mostly yellow colorations, particularly on polyesters.

3 Claims, No Drawings

N-SUBSTITUTED IMINOCOUMARIN DYES

The invention relates to dyes of the formula (I):

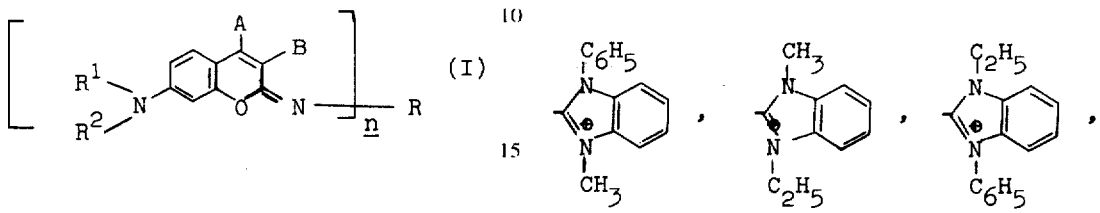

in which
- A is hydrogen or alkyl of one to four carbon atoms;
- B is an aromatic or heterocyclic radical;
- R is hydroxy, substituted amino or an aliphatic, cycloaliphatic, araliphatic, aromatic or heterocyclic radical;
- $R^1$ is hydrogen or unsubstituted or substituted alkyl, cycloalkyl or aralkyl;
- $R^2$ is hydrogen or unsubstituted or substituted alkyl, cycloalkyl or aralkyl;
- $R^1$ and $R^2$ together with the nitrogen may be a heterocyclic ring; and
- $n$ is 1 or 2.

Examples of alkyl radicals A are ethyl, propyl, butyl and preferably methyl.

Examples of radicals B are phenyl, phenyl bearing chloro, bromo, methyl, ethyl, ethoxy, methoxy, cyano, nitro, carboxyl, carbalkoxy, carbamoyl, N-substituted carbamoyl, sulphonic ester sulfonamido, N-substituted sulfonamido or alkylsulfonyl as a substituent, naphthyl, thenyl or furyl, benzimidazolyl, benzothiazolyl, benzoxazolyl, 3,4-dihydro-4-oxoquinazolyl-(2) and 3,4-dihydro-3-oxoquinoxalyl-(2).

Specific examples of B apart from those already given are: o-cyanophenyl, p-cyanophenyl, p-nitrophenyl, 2-chloro-4-cyanophenyl, 2-bromo-4-cyanophenyl, 2-chloro-4-nitrophenyl, 2,6-dichloro-4-nitrophenyl, 2-methyl-4-cyanophenyl, 2-methyl-4-nitrophenyl, 2-ethoxy-4-cyanophenyl, 2-methoxy-4-nitrophenyl, 2-carbomethoxy-4-cyanophenyl, 4-carboethoxyphenyl, 4-carbamoylphenyl, 4-(N-methylcarbamoyl)-phenyl, 4-(N,N-diethylcarbamoyl)-phenyl, 4-ethoxysulfonylphenyl, 4-butoxysulfonylphenyl, 4-dimethylaminosulfonylphenyl, 4-dibutylaminosulfonylphenyl, 4-methylsulfonylphenyl, 4-ethylsulfonylphenyl, 5-carbomethoxyphenyl, 5-carboethoxyphenyl, 5-carbobutoxyphenyl, 5-cyanothenyl, 4-carbamoylthenyl, 5-carbomethoxyfuryl, 5-carboethoxyfuryl, 5-carbobutoxyfuryl, 5-cyanofuryl, 5-carbamoylfuryl, N-methylbenzimidazolyl, N-benzylbenzimidazolyl, N-phenylbenzimidazolyl, 5-methylbenzimidazolyl, 5-chlorobenzimidazolyl, 5-methoxybenzimidazolyl, 5-chlorobenzothiazolyl, 5-chlorobenzoxazolyl, 5-methylbenzoxazolyl, 7-chloro-3,4-dihydro-4-oxoquinazolyl-(2) or 3,4-dihydro-4-methyl-3-oxoquinoxalyl-(2).

The radical B may moreover be a quaternary group having one of the formulae:

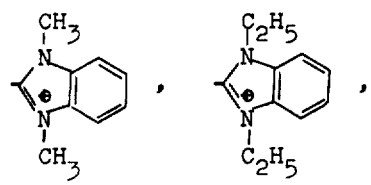

or the corresponding derivatives bearing chloro, methyl or methoxy as a substituent in the benzene ring. Not only methyl and ethyl but also hydroxyethyl, hydroxypropyl and β-hydroxy-γ-chloropropyl are suitable as quaternizing radicals and they may be introduced by quaternization with the appropriate epoxides.

Examples of radicals R are alkyl of one to eight carbon atoms, alkyl of two to eight carbon atoms bearing hydroxy, alkoxy, acyloxy, amino or N-substituted amino as a substituent, alkylene of two to six carbon atoms, unsubstituted or substituted phenyl and heterocyclic radicals which may bear chloro, methyl or methoxy as a substituent.

Specific examples of R are as follows: methyl, ethyl, propyl, butyl, hexyl, β-ethylhexyl, β-hydroxyethyl, β-hydroxypropyl, γ-hydroxypropyl, β-methoxyethyl, β-ethoxyethyl, γ-methoxypropyl, γ-ethoxypropyl, γ-hexoxypropyl, γ-acetoxypropyl, γ-propionylpropyl, γ-benzoyloxypropyl, γ-dimethylaminopropyl, γ-dibutylaminopropyl, γ-trimethylammoniumpropyl, γ-methyldibutylammoniumpropyl, γ-ethyldibutylammoniumpropyl, γ-ethyldimethylammoniumpropyl, β-aminoethyl,ω-aminohexyl, dimethylene, tetramethylene, hexamethylene, cyclohexyl, benzyl, phenylethyl, phenyl, chlorophenyl, dichlorophenyl, trichlorophenyl, methylphenyl, dimethylphenyl, ethylphenyl, methoxyphenyl, ethoxyphenyl, carboxylphenyl, carbamoylphenyl, sulfamoylphenyl, aminophenyl, dimethylaminophenyl, phenylaminophenyl, phenylaminocarbonylaminophenyl, benzoylaminophenyl, methoxycarbonylphenyl, ethoxycarbonylphenyl, butoxycarbonylphenyl, phenylene, diphenylenemethane and phenylamino; 2-benzothiazolyl, 2-imidazolyl, 2-(N-methyl)-benzothiazolium, 2-(N,N'-dimethyl)-imidazolium, 2-pyridyl, 2-(4-methyl-5-acetyl)-thiazolyl, 2-(4,5-diphenyl)-thiazolyl, 2-(4,5-dimethyl)-thiazolyl, 2-(4- methyl-5-carbomethoxy)-thiazolyl, 2-(4-phenyl-5-carbomethoxy)-thiazolyl, 2-(4,5-di-p-methoxyphenyl)-thiazolyl, 2-(3,4-dimethyl-5-acetyl)-thiazolium, 2-(3-methyl-4,5-diphenyl)-thiazolium, 2-(3-ethyl-4,5-dimethyl)-thiazolium, 2-(3-ethyl-4,5-di-p-methoxyphenyl)thiazolium, 5-(3-S-methyl-1,2,4-thiadiazolyl), 5-(3-β-carbomethoxyethylmercapto)-1,2,4-thiadiazolyl) and 5-(N-methyl-3-S-methyl-1,2,4-thiadiazolium).

Suitable anions for the dyes containing quaternary groups are simple or complex inorganic or organic anions. Specific examples are: chloride, bromide, sulfate, methosulfate, ethosulfate, nitrate, thiocyanate, tetrachlorozincate, tetrafluoborate, formate, acetate and toluenesulfonate.

Examples of radicals $R^1$ and $R^2$ are: methyl, ethyl, n-propyl, isopropyl, n-butyl, isobutyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl and β-acetoxypropyl.

Examples of radicals formed by $R^1$ and $R^2$ together with the nitrogen are pyrrolidine, piperidine, morpholine, piperazine and N-methylpiperazine.

The new dyes have high brightness and the shades lie in the range from yellow to red. They are suitable for dyeing textile material of polyamides, cellulose esters, acrylonitrile polymers and polyesters and also for the production of bright textile prints based on pigmented plastics and for the production of daylight fluorescent pigments.

Dyes of the formula (I) may be prepared by reacting a compound of the formula (II):

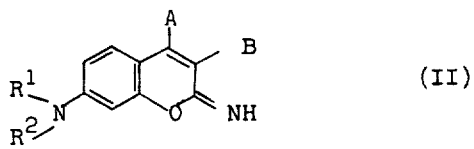

with a primary amine of the formula (III):

and if desired quaternizing the reaction product for the production of the quaternary compound.

Reaction products having free —OH or —NH₂ groups may be acylated if desired.

Compounds of the formula (II) and their production are disclosed for example in DOS 1,619,567, DOS 1,569,777 and DOS 2,129,565.

Compounds in which A is not hydrogen may be prepared analogously to compounds of formula (II) in which A is hydrogen.

Reaction of component (II) with component (III) is conveniently carried out by heating in the presence of a solvent, component (III) serving as solvent if desired. Examples of other solvents are: alcohols such as ethanol, propanol or butanol; glycols such as ethylene glycol or diethylene glycol; glycol ethers such as ethylene glycol monomethyl, monoethyl or monobutyl ether; hydrocarbons such as toluene or xylene; chlorohydrocarbons such as perchloroethylene or chlorobenzene; and dimethylformamide, N-methylpyrrolidone and dimethylsulfoxide.

Preferred reaction temperatures are from about 50° to 200°C, particularly from 80° zo 150°C.

Quaternization, if carried out, is by conventional methods; examples of quarternizing agents are alkyl halides and particularly dialkyl sulfates.

If an acylation is desired it is carried out by a conventional method, for example with an acid chloride or isocyanate.

Examples of primary amines of the formula (III) are: methylamine, ethylamine, n-propylamine, isopropylamine, n-butylamine, isobutylamine and hexylamine; β-ethylhexylamine, β-hydroxyethylamine, β-hydroxypropylamine, γ-hydroxypropylamine, β-methoxyethylamine, β-ethoxyethylamine, γ-methoxypropylamine, γ-ethoxypropylamine; γ-hexoxypropylamine, γ-acetoxypropylamine, γ-propionyloxypropylamine, γ-benzoyloxypropylamine, γ-dimethylaminopropylamine and γ-dibutylaminopropylamine; ethylenediamine, hexamethylenediamine, tetrame - thylenediamine, cyclohexylamine, benzylamine, phenylethylamine; aniline, p-chloroaniline, 3,4-dichloroaniline, 2,4,5-trichloroaniline, p-toluidine, p-dimethylaminoaniline, p-ethylaniline, m-anisidine, p-anisidine, p-ethoxyaniline; p-aminobenzoic acid, p-aminobenzamide, p-aminobenz-N,N-dimethylamide, p-aminobenzenesulfonamide; p-benzoylaminoaniline, p-carbomethoxyaniline, p-carboethoxyaniline, p-carbobutoxyaniline, p-phenylenediamine, 4,4'-diaminodiphenylmethane, 2-aminobenzothiazole, 2-aminobenzimidazole, 2-amino-1-methylbenzimidazole, 2-aminopyridine, 2-amino-4-methyl-5-acetylthiazole, 2-amino-4,5-dimethylthiazole, 2-amino-4-methyl-5-carbomethoxythiazole, 2-amino-4-phenyl-5-carbomethoxythiazole, 2-amino-4,5-di-(p-methoxyphenyl)-thiazole, 5-amino-3-methylmercapto-1,2,4-thiadiazole and 5-amino-3-β-carbomethoxyethylmercapto-1,2,4-thiadiazole.

Dyes of the formula (Ia):

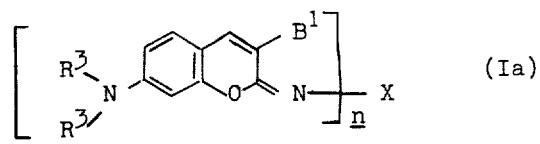

in which
B¹ is unsubstituted or substituted benzimidazolyl, benzothiazolyl, 3,4-dihydro-4-oxoquinazolyl, phenyl, thenyl or furyl;
R³ is methyl or ethyl;
n is 1 or 2; and
X is an aliphatic radical of up to twelve carbon atoms, a cycloaliphatic radical or unsubstituted or substituted phenyl;
are of special industrial significance.

Chloro, methyl, cyano, nitro, carbalkoxy and carbamoyl are preferred substituents for the radical B¹.

Hydroxy, alkoxy, alkanoyloxy, benzoyloxy, dialkylamino and alkylammonium are preferred substitutents for the aliphatic radical X and alkyl, alkoxy, halogen, carbamoyl, sulfamoyl, carbalkoxy, carboxyl, amino and dialkylamino are preferred substituents for the phenyl radical.

Examples of preferred radicals B¹ are: p-nitrophenyl, p-cyanophenyl, benzimidazolyl, 5-methylbenzimidazolyl(2), benzothiazolyl, 5-chlorobenzothiazolyl-(2), 3,4-dihydro-4-oxoquinazolyl, 7-chloro-3,4-dihydro-4-oxoquinazolyl-(2), 5-carbomethoxyphenyl-(2), 5-carboethoxyphenyl-(2), 5-carbamoylphenyl-(2), 5-carbomethoxyfuryl-(2), 5-carboethoxyfuryl-(2), 5-carboethoxyfuryl-(2) and 5-carbamoylfuryl-(2).

Specific radicals X include alkyl of three to eight carbon atoms, phenylalkyl of seven to nine carbon atoms, hydroxyalkyl of two to six carbon atoms, alkoxyalkyl of a total of three to seven carbon atoms, dialkylaminoalkyl of a total of four to 11 carbon atoms, alkylammoniumalkyl of a total of six to 12 carbon atoms, cyclohexyl, methylcyclohexyl, phenyl and phenyl bearing methyl, ethyl, methoxy, ethoxy, chloro, cyano, carbamoyl, sulfamoyl, carboxyl or dialkylamino of one to four carbon atoms in the alkyl groups as substituents.

Preferred radicals X are propyl, butyl, hexyl, β-ethylhexyl, cyclohexyl, 2-methylcyclohexyl, phenylethyl, β-hydroxyethyl, γ-hydroxypropyl, ω-hydroxyphenyl, β-methoxyethyl, p-methoxypropyl, γ-butoxypropyl, p-dimethylaminopropyl, γ-dibutylaminopropyl, p-trimethylammoniumpropyl, dimethylethylammoniumpropyl, dimethylbenzylammoniumpropyl, phenyl, p-methylphenyl, p-ethylphenyl, p-chlorophenyl, 3,4-dichlorophenyl, p-methoxyphenyl, m-methoxyphenyl, p-ethoxyphenyl, p-sulfamoylphenyl, p-carboxyphenyl, p-cyanophenyl and p-dimethylaminophenyl.

Preferred diamines: $X(NH_2)_n$ are: p-phenylenediamine, 4,4'-diaminodiphenylmethane, ethylenediamine and hexamethylenediamine.

The following Examples illustrate the invention. References to parts and percentages are by weight unless otherwise stated.

EXAMPLE 1

16.6 parts of 3-(benzimidazol-2'-yl)7-diethylaminocoumarinimide and 25.5 parts of p-chloroaniline are boiled under reflux in 60 parts of ethyl glycol for 4 hours. After cooling the deposited precipitate is suction filtered and washed with ether. 18.7 parts (85% of theory) of the compound of the formula:

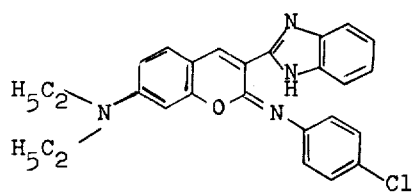

is obtained which after recrystallization from methyl glycol melts at 209° to 211°C.

The compounds set out in the following Table 1 and of the general formula:

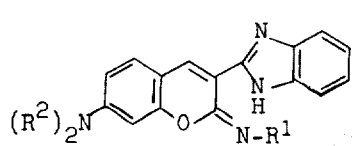

may be prepared analogously:

TABLE 1

| Example | R¹ | R² | Melting point |
|---|---|---|---|
| 2 | —C₆H₄—C₂H₅ | C₂H₅ | 170 to 172°C |
| 3 | —C₆H₄—CH₃ | C₂H₅ | 200 to 202°C |
| 4 | —C₆H₄—N(CH₃)₂ | C₂H₅ | 214 to 216°C |
| 5 | —C₆H₄—OCH₃ | C₂H₅ | 195 to 197°C |
| 6 | —C₆H₄—OC₂H₅ | C₂H₅ | 197 to 199°C |
| 7 | —C₆H₅ | C₂H₅ | 200 to 203°C |
| 8 | 3-Cl,4-Cl-C₆H₃— | C₂H₅ | 198 to 200°C |
| 9 | —NH—C₆H₅ | C₂H₅ | 212 to 214°C |
| 10 | 2-Cl-C₆H₄— | C₂H₅ | 240 to 242°C |
| 11 | cyclohexyl | C₂H₅ | 207 to 210°C |
| 12 | —CH₂—CH₂—C₆H₅ | C₂H₅ | 175 to 177°C |
| 13 | —CH(C₆H₅)(OCH₃) | C₂H₅ | 202 to 204°C |
| 14 | —C₆H₄—NH₂ | C₂H₅ | 238 to 240°C |
| 15 | —C₆H₄—OCH₃ | CH₃ | 210 to 212°C |
| 16 | cyclohexyl | CH₃ | 266 to 268°C |
| 17 | —CH₂—CH₂—C₆H₅ | CH₃ | 232 234°C |

TABLE 1-Continued

| Example | R¹ | R² | Melting point |
|---|---|---|---|
| 18 | —C₆H₄—SO₂—NH₂ | CH₃ | >300°C |
| 19 | —(CH₂)₃—CH₃ | CH₃ | 155 to 157°C |
| 20 | —(CH₂)₃—N(CH₃)₂ | CH₃ | 155 to 157°C |
| 21 | —(CH₂)₃—OCH₃ | CH₃ | 152 to 154°C |
| 22 | —C₆H₄—CH₃ | CH₃ | 232 to 234°C |
| 23 | —C₆H₄—SO₂—NH₂ | C₂H₅ | 310 to 312°C (decomposition) |
| 24 | —C₆H₄—COOH | C₂H₅ | 358 to 360°C |

EXAMPLE 25

16.6 parts of 3-(benzimidazol-2'-yl)-7-diethylaminocoumarinimide and 2.7 parts of p-phenylenediamine in 45 parts of ethyl glycol are boiled for 5 hours under reflux, and cooled. The precipitate is suction filtered and washed with ether. 16.2 parts (88% of theory) of the compound of the formula:

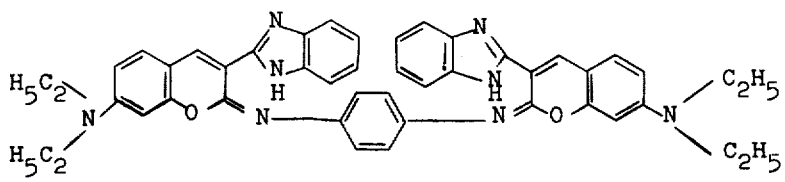

is obtained. It melts at 238° to 240°C after it has been recrystallized from methyl glycol.

EXAMPLE 26

15.9 parts of 3-p-cyanophenyl-7-diethylaminocoumarinimide and 20.6 parts of p-phenetidine in 45 parts of ethyl glycol are boiled under reflux for 6 hours, and cooled. The precipitate is suction filtered and washed with alcohol and ether. 17.5 parts (80% of theory) of the compound of the formula:

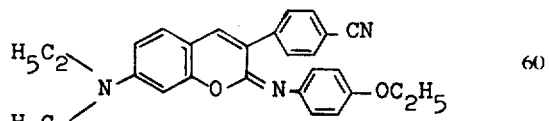

is obtained. The substance melts at 147° to 149°C after it has been recrystallized from methyl glycol. The compounds of the general formula:

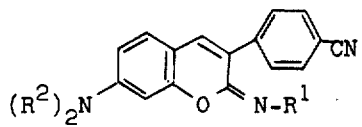

set out in Table 2 may be prepared by similar methods.

TABLE 2

| Example | R¹ | R² | Melting point |
|---|---|---|---|
| 27 | —C₆H₄—SO₂NH₂ | C₂H₅ | 278 to 280°C |
| 28 | —C₆H₁₁ | CH₃ | 205 to 207°C |
| 29 | —C₆H₅ | C₂H₅ | 182 to 183°C |

EXAMPLE 30

16.6 parts of 3-(benzimidazol-2'-yl)-7-diethylaminocoumarinimide and 6.9 parts of hydroxylamine hydrochloride are heated to 100°C in 55 parts of methyl glycol. 12.9 parts of ethyldiisopropylamine is then added at this temperature within fifteen minutes. The whole is kept at 100°C for another 3 hours, allowed to cool and the precipitate is suction filtered. 16.2 parts of crude product is obtained which is purified by recrystallization from dimethylformamide. The compound has the formula:

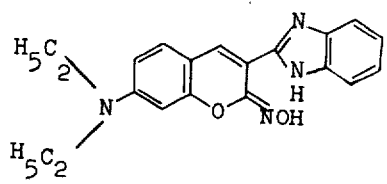

and melts at 275° to 277°C.

EXAMPLE 31

16.6 parts of the coumarinimide of the formula:

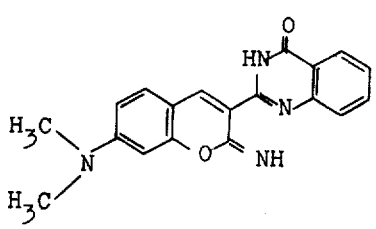

and 20.6 parts of p-phenetidine in 40 parts of methyl glycol are boiled under reflux for one hour and cooled. The precipitate is suction filtered and washed with water. The product obtained is recrystallized from dimethylformamide. 18.4 parts (81.5% of theory) of the compound of the formula:

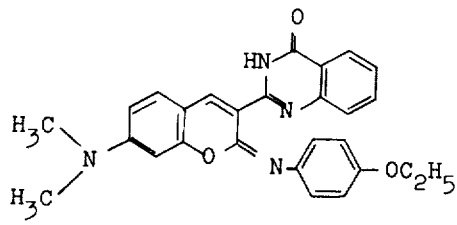

is obtained. The substance melts at 260° to 262°C.

The compounds set ou in Table 3 and of the formula:

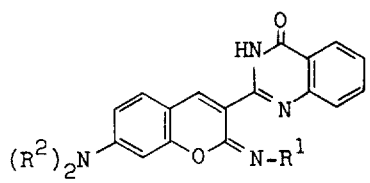

are obtained by similar methods.

TABLE 3

| Example | R¹ | R² | Melting point |
| --- | --- | --- | --- |
| 32 | —(CH₂)₃—OCH₃ | CH₃ | 175 to 177°C |
| 33 | —(CH₂)₃—N(CH₃)₂ | CH₃ | 205 to 207°C |
| 34 | —C₆H₄—NH₂ | CH₃ | 292 to 295°C |
| 35 | —C₆H₄—OCH₃ | C₂H₅ | 244 to 246°C |
| 36 | —C₆H₅ | C₂H₅ | 222 to 224°C |
| 37 | —C₆H₄—NH₂ | C₂H₅ | 268 to 270°C |
| 38 | —C₆H₄—SO₂—NH₂ | C₂H₅ | 277 to 280°C |
| 39 | —(CH₂)₃—CH₃ | C₂H₅ | 168 to 170°C |
| 40 | —(CH₂)₃—N(CH₃)₂ | C₂H₅ | 172 to 174°C |
| 41 | —(CH₂)₃—OCH₃ | C₂H₅ | 158 to 160°C |

EXAMPLE 42

3.9 parts of benzoyl chloride is allowed to drip at room temperature into a suspension of 11.3 parts of the coumarin derivative of the formula:

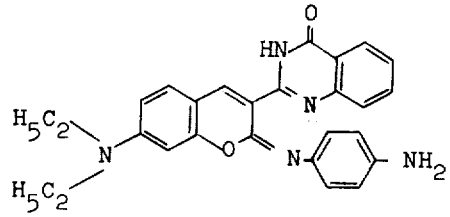

in 200 parts of pyridine while stirring. The whole is stirred for another three hours at room temperature and for 5 hours at 40°C. Then 400 parts of water is added and the deposited precipitate is suction filtered and washed with water. The compound of the formula:

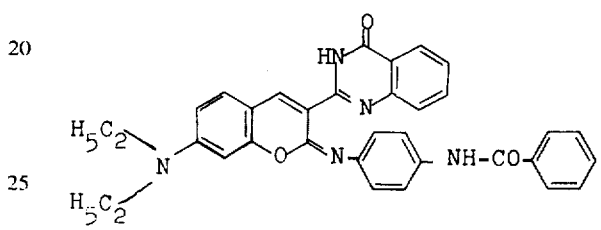

is obtained in a quantitative yield. The substance does not melt below 300°C after it has been recrystallized from a mixture (1:1) of methyl glycol and dimethylformamide.

EXAMPLE 43

11.3 parts of the coumarin derivative of the formula:

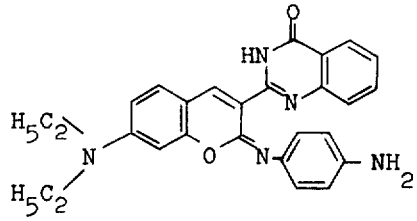

is heated to 50°C in 260 parts of dry o-dichlorobenzene. 3.6 parts of phenyl isocyanate is allowed to drip in at this temperature while stirring and the whole is then stirred for another 11 hours at 50°C. After cooling the product is suction filtered and washed with ether. A quantitative yield of the compound of the formula:

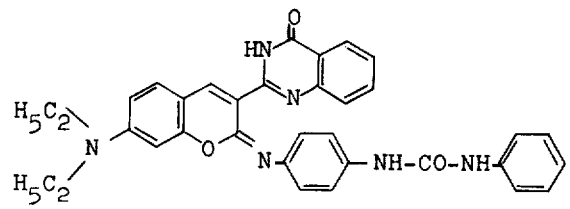

is obtained. After recrystallization from dimethylformamide the substance melts at 238° to 240°C.

Using a similar method the compounds are obtained which are set out in Table 4 and which have the formula:

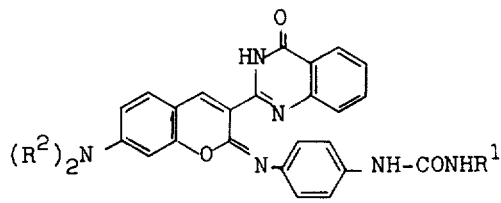

set out in Table 5 may be prepared by similar methods.

TABLE 4

| Example | R¹ | R² | Melting point |
|---|---|---|---|
| 44 | -C₆H₃(Cl)-Cl | C₂H₅ | 264 to 266°C |
| 45 | -C₆H₅ | CH₃ | >300°C |
| 46 | -C₆H₃(Cl)-Cl | CH₃ | >300°C |

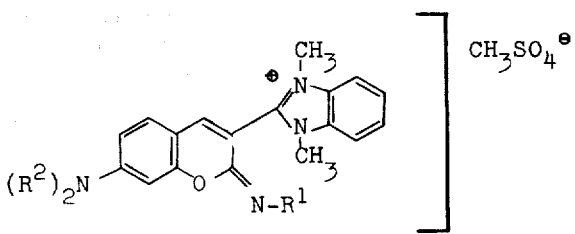

TABLE 5

| Example | R¹ | R² |
|---|---|---|
| 48 | -C₆H₄-C₂H₅ | C₂H₅ |
| 49 | -C₆H₄-OCH₃ | C₂H₅ |
| 50 | -C₆H₅ | C₂H₅ |
| 51 | -C₆H₄-CH₃ | C₂H₅ |
| 52 | -C₆H₃(Cl)-OC₂H₅ | C₂H₅ |
| 53 | -C₆H₄-Cl | C₂H₅ |
| 54 | -C₆H₄-H | C₂H₅ |
| 55 | -(CH₂)₃-OCH₃ | CH₃ |

EXAMPLE 47

8.8 parts of the coumarin derivative of the formula:

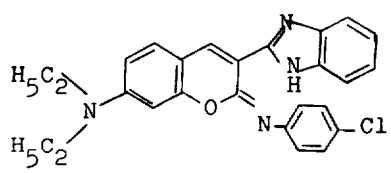

is boiled under reflux for 2 hours in 125 parts of ethylene chloride with 6.4 parts of dimethyl sulfate and 2.0 parts of magnesium oxide. Insoluble matter is filtered off and washed with ethylene chloride and the filtrate is concentrated in vacuo so that as a residue there is obtained 11.2 parts of the quaternary salt of the formula:

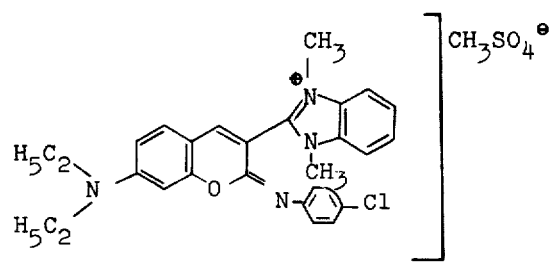

Quaternized compounds of the general formula:

EXAMPLE 56

8.2 parts of the coumarin derivative of the formula:

is boiled under reflux in 125 parts of ethylene chloride with an addition of 15.6 parts of diethyl sulfate and 4 parts of magnesium oxide for 22 hours. Insoluble matter is filtered off while hot and washed with ethylene chloride, and the filtrate is concentrated in vacuo. The residue is stirred into 1,500 parts of hot water and the solution filtered. A solution of 15 parts of zinc chloride in a small amount of water is added and the solution is saturated with sodium chloride. The precipitated zinc chloride double salt of the formula:

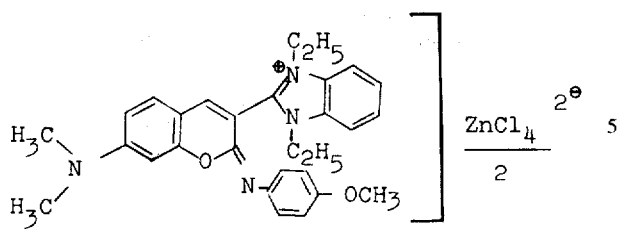

is suction filtered and dried.

EXAMPLE 57

49 parts of the coumarin derivative of the formula

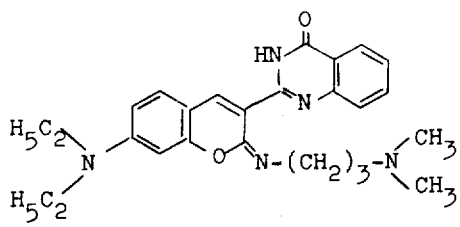

is heated at 40° to 50°C in 90 parts of dry o-dichlorobenzene. 3.8 parts of dimethyl sulfate is then allowed to dip in while stirring and stirring is continued for another hour at 40° to 50°C. After cooling the precipitate is suction filtered and washed with ether. 6.1 parts (97% of theory) of the quaternary salt of the formula:

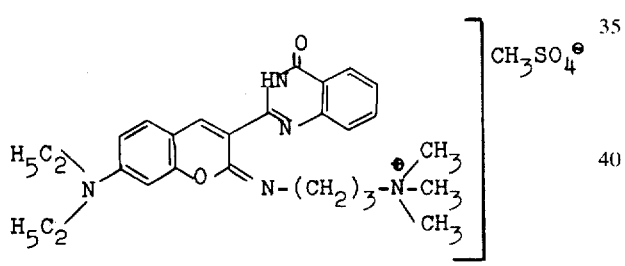

EXAMPLE 58

2-(N-p-methoxyphenyl)-imino-3-(p-cyanophenyl)-7-diethylaminocoumarin

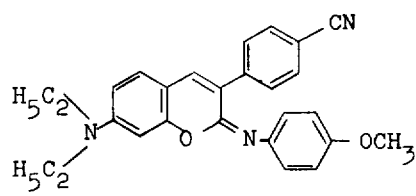

A mixture of 2 parts of 2-imino-3-p-cyanophenyl-7-diethylaminocoumarin and 10 parts of p-anisidine is stirred for 1 hour at 95°C. After cooling to 25°C 200 parts of water is added. After the product has been stirred for another 2 hours the product is suction filtered, washed with 200 parts of water and dried. The yield is 2.6 parts and the melting point is 156°C.

EXAMPLE 59

2-(N-p-methoxyphenyl)-imino-3-(2'-thenyl-5'-carbomethoxy)-7-diethylaminocoumarin

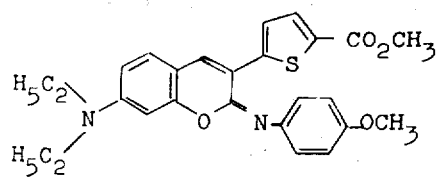

A mixture of 2 parts of 2-imino-3-(2'-thenyl-5'-carbomethoxy)7-diethylaminocoumarin and 10 parts of p-anisidine is stirred for 1 hour at 100°C, cooled to about 50°C, 150 parts of water is added, the whole is cooled to 5°C and the precipitate filtered. The residue is again stirred in 600 parts of water for three hours, suction filtered and dried. The yield is 2.4 parts and the melting point is 170° to 172°C.

EXAMPLE 60

2-(N-p-methoxyphenyl)-imino-3-(2'-furyl-5'-carbomethoxy)-7-diethylaminocoumarin

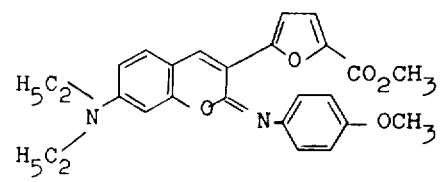

A mixture of 3.4 parts of 2-imino-3-(2'-furyl-5'-carbomethoxy)-7-diethylaminocoumarin and 10 parts of p-anisidine is stirred for 2 hours at 95°C. After cooling to about 50°C 150 parts of water is added. The whole is then cooled to 5°C and the precipitate filtered. The residue is again stirred for three hours in 600 parts of water, suction filtered and dried. The yield is 2.6 parts and the melting point is 130° to 132°C.

EXAMPLE 61

2-(N-p-methoxyphenyl)-imino-3-(2'-benzothiazolyl)-7-diethylaminocoumarin

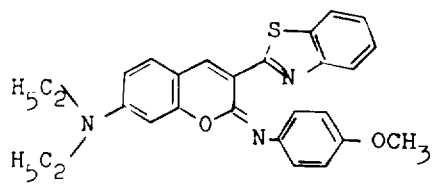

A mixture of 5.2 parts of 2-imino-3-(2'-benzothiazolyl)-7-diethylaminocoumarin and 15 parts of p-anisidine is stirred for 2 hours at 100°C. After the whole has cooled to about 25°C 300 parts of water is added, stirring is continued for another ten hours, and the product is suction filtered, washed with 100 parts of water and dried. It is recrystallized from acetic anhy-

EXAMPLE 62

2-(N-p-chlorophenyl)-imino-3-(2'-thenyl-5'-carbomethoxy)-7-diethylaminocoumarin

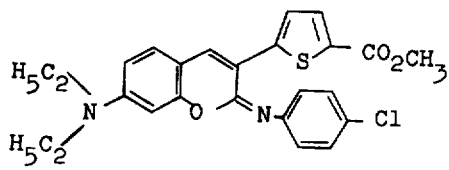

A mixture of 3.6 parts of 2-imino-3-(2'-thenyl-5'-carbomethoxy)-7-diethylaminocoumarin and 10 parts of p-chloroaniline is stirred at 120°C for 2 hours. After cooling to about 25°C 250 parts of water is added, the whole is stirred for another 2 hours and suction filtered and the product again stirred with 250 parts of water for 5 hours, suction filtered and dried. 4.8 parts of yellow crystals are obtained. The melting point is 172° to 174°C.

EXAMPLE 63

2-(N-benzothiazolyl-2')-imino-3-p-cyanophenyl-7-diethylaminocoumarin

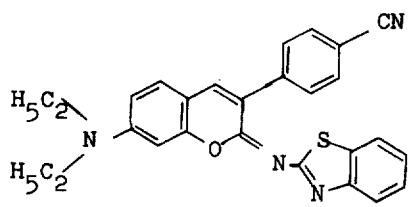

A solution of 4.5 parts of 2-aminobenzothiazole and 6.34 parts of 2-imino-3-p-cyanophenyl-7-diethylaminocoumarin in 80 parts of diethylene glycol diethyl ether is stirred for 5 hours at 180°C and then cooled to 5°C. The precipitated product is suction filtered, washed with 20 parts of methanol and dried. The yield is 5.8 parts and the melting point is 212° to 214°C.

EXAMPLE 64

The dye of the formula:

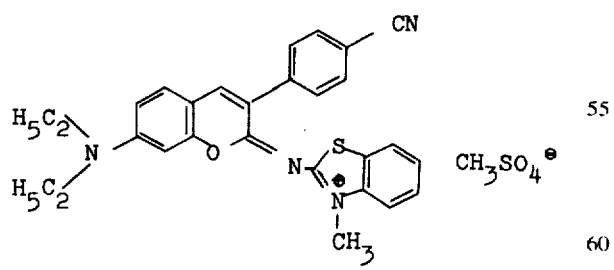

is obtained by stirring a solution of 4.5 parts of the dye described in Example 63 in 50 parts of chlorobenzene and .125 parts of dimethyl sulfate for 10 minutes at 90°C, cooling to 5°C and suction filtering the precipitated product. After washing it with 150 parts of petroleum ether 40/60/acetone (1:1) and drying it the yield is 3.3 parts and the melting point is 250° to 252°C.

EXAMPLE 65

2-[N-(4'-methyl-5'-acetylthiazolyl-2')]-imino-3-p-cyanophenyl-7-diethylaminocoumarin

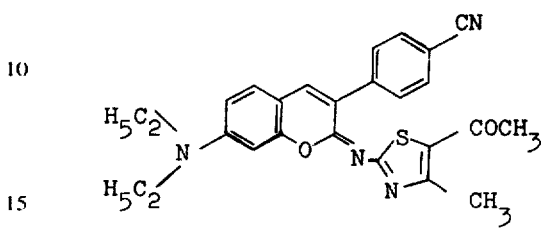

A solution of 6.3 parts of 2-imino-3-p-cyanophenyl-7-diethylaminocoumarin and 3.1 parts of 2-amino-4-methyl-5-acetylthiazole in 50 parts of diethylene glycol diethyl ether is stirred at 140°C for 1 hour, cooled to 5°C, suction filtered and washed with 5 parts of methanol. The product is recrystallized from glycol monoethyl ether. 3 parts of yellow crystals are obtained having a melting point of 218° to 220°C.

EXAMPLE 66

The dye of the formula:

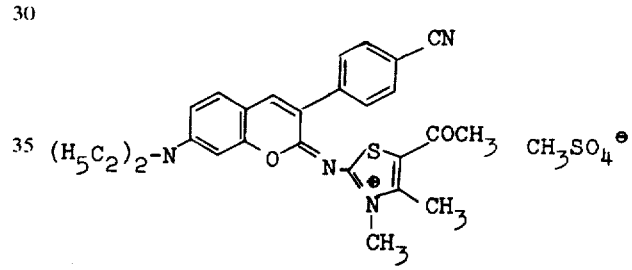

is obtained by stirring a solution of 2.3 parts of the dye specified in Example 65 in 50 parts of chlorobenzene and 0.63 part of dimethyl sulfate for 10 minutes at 90°C, cooled to 5°C, suction filtered and dried. The yield is 2.6 parts and the melting point is 195° to 197°C.

EXAMPLE 67

2-[N-(3'-methylmercapto-1',2',4'-thiadiazolyl-5')]-imino-3-p-cyanophenyl-7-diethylaminocoumarin

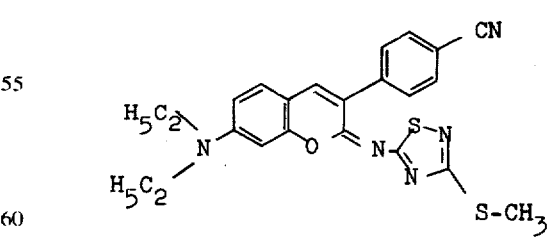

A mixture of 3.2 parts of 2-imino-3-p-cyanophenyl-7-diethylaminocoumarin and 10 parts of 5-amino-3-methylmercapto-1,2,4-thiadiazole is heated to 140°C and stirred at this temperature for 1.25 hours. It is cooled to 50°C and 100 parts of methanol is added. It is further cooled to 5°C, suction filtered and dried. The

EXAMPLE 68

The dye of the formula:

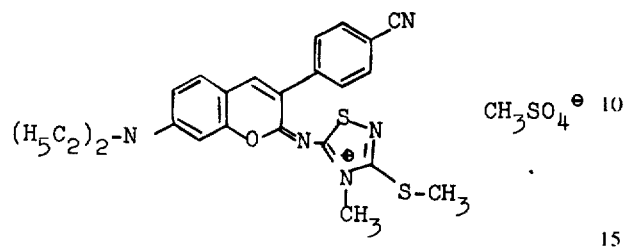

is obtained by stirring a solution of 2.9 parts of the dye described in Example 67 in 50 parts of chlorobenzene and 0.9 part of dimethyl sulfate for 30 minutes at 90°C, cooling to 5°C, suction filtering and drying. The yield is 3.5 parts and the melting point is 163° to 165°C.

We claim:

1. A dye of the formula:

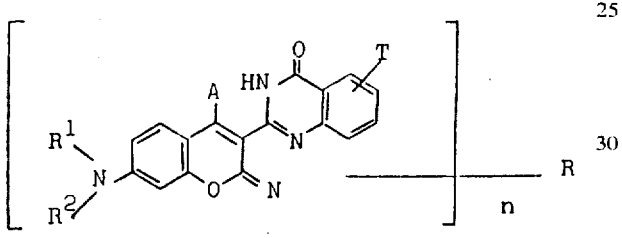

in which
  A is hydrogen, methyl or ethyl,
  $R^1$ and $R^2$ are alkyl of one to four carbon atoms,
  T is hydrogen or chloro,
  n is 1 or 2 and
  R is a monovalent moiety selected from the group consisting of hydroxy, alkyl of three to eight carbon atoms, phenylalkyl of seven to nine carbon atoms, hydroxyalkyl of two to six carbon atoms, alkoxyalkyl of a total of three to seven carbon atoms, dialkylaminoalkyl of a total of four to 11 carbon atoms, alkylammoniumalkyl of a total of six to 12 carbon atoms, cyclohexyl, methylcyclohexyl, phenyl and phenyl substituted by methyl, ethyl, methoxy, ethoxy, chloro, cyano, carbamoyl, sulfamoyl carboxyl, amino or dialkylamino of one to four carbon atoms in the alkyl groups, or a divalent moiety selected from the group consisting of $-CH_2CH_2-$, $-(CH_2)_6$,

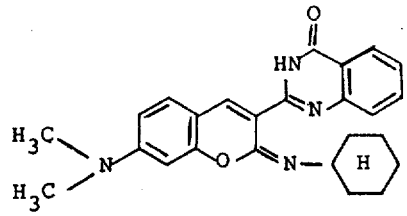

2. A dye as claimed in claim 1 of the formula:

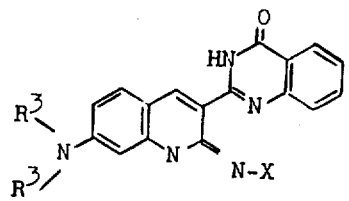

in which
  R is methyl or ethyl and
  X is alkyl of three to eight carbon atoms, cyclohexyl or methylcyclohexyl.

3. The dye of the formula

* * * * *